Feb. 28, 1950 W. J. O'BRIEN 2,499,326
DYNAMOELECTRIC MACHINE STRUCTURE
Filed Aug. 27, 1945 2 Sheets-Sheet 1

INVENTOR.
WILLIAM J. O'BRIEN,
BY
Harold W. Mattingly
ATTORNEY.

Feb. 28, 1950        W. J. O'BRIEN        2,499,326

DYNAMOELECTRIC MACHINE STRUCTURE

Filed Aug. 27, 1945        2 Sheets-Sheet 2

INVENTOR.
WILLIAM J. O'BRIEN,
BY
Harold W. Mattingly
ATTORNEY.

Patented Feb. 28, 1950

2,499,326

UNITED STATES PATENT OFFICE 2,499,326

DYNAMOELECTRIC MACHINE STRUCTURE

William J. O'Brien, London, England, assignor to The Decca Record Company Limited, London, England, a corporation of Great Britain Application August 27, 1945, Serial No. 612,984

5 Claims. (Cl. 171—252)

My invention relates to an electrical instrument and has particular reference to a new coil structure which finds particular utility when used with goniometers and like double field instruments.

In goniometers, synchroscopes, power factor meters and similar instruments, two sets of field coils are used with their axes disposed at right angles to each other. For these instruments, to faithfully indicate the angular relationship between the two coil potentials, it is necessary that the coils be so arranged as to produce a uniform and undistorted magnetic field. Prior to my invention this requirement was not fully met and such uniformity as was obtained was obtained at the expense of the efficiency of the instrument or at unreasonable cost.

In certain electrical systems an indication of this accumulative angle change between two alternating potential systems is often required. In the absence of the device of my invention, this can be accomplished only through the use of large, expensive or inaccurate apparatus.

It is, therefore, an object of my invention to provide an instrument for indicating the accumulative angle change between two alternating potential systems and which comprises a goniometer coupled to a registering mechanism.

It is an additional object of my invention to provide a coil structure having a goniometer which includes two pairs of identical coil supports mounted symmetrically and at right angles to each other.

It is a still further object of my invention to provide a coil structure of the character set forth in the preceding paragraph in which one of the pairs of supports encircles and is supported by the other pair.

It is also an object of my invention to provide a coil structure of the character set forth in which the coil supports are formed of insulating material of channel-shaped cross section and given a rectangular shape.

It is additionally an object of my invention to provide a structure of the character described in the preceding paragraph in which the long internal dimension of the support is substantially equal to the short external dimension.

Other objects and advantages of my invention will be apparent from a study of the following specifications, read in connection with the accompanying drawings, wherein.

Figure 1:
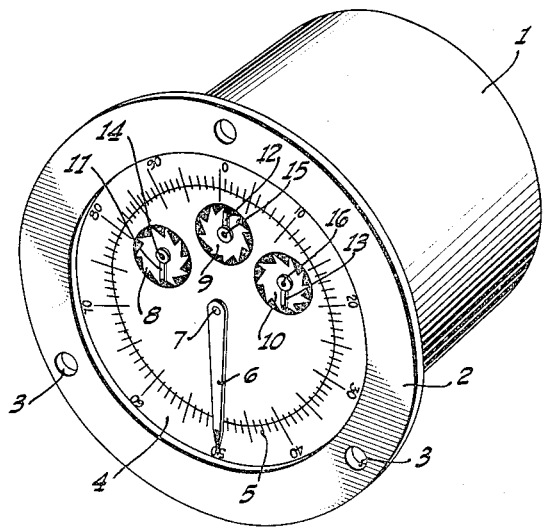
Fig. 1 is a perspective view illustrating the general form and appearance of a registering goniometer comprising the preferred embodiment of my invention.

Referring to the drawings, I have illustrated as the preferred embodiment of my invention a registering goniometer designed for flush panel mounting. The device as illustrated comprises a main case or housing 1 to which is attached by any suitable means a mounting flange 2, the flange 2 being drilled as indicated at 3 to permit the device to be mounted on a supporting panel.

Within the flange 3 there is mounted a circular dial plate 4 which is graduated around its periphery as by a plurality of graduations 5 etched or suitably inscribed in or upon the dial plate 4. The circle comprising the graduations 5 may be divided into any desired number of parts. The graduations shown in Fig. 1 comprise one hundred divisions for a full circle, this form of graduation being selected for convenience.

The scale comprising the graduations 5 is traversed by a pointer 6 which is mounted upon a centrally located and axially extending goniometer shaft 7. Above the shaft 7 there are provided registering dials 8, 9 and 10, each of these dials being, by preference, divided into ten equal divisions and being arranged to be traversed by indicating hands 11, 12 and 13. The hands 11—13 are mounted, respectively, upon shafts 14, 15 and 16. These shafts are connected to each other and to the goniometer shaft 7 by gearing to be described hereinafter and arranged to provide a ten to one drive ratio between the shafts 7 and 14, between the shafts 14 and 15 and between the shafts 15 and 16. Thus the dial 10 may be considered as indicating the 100's, the dial 9 as indicating the 10's, the dial 8 as indicating the 1's and the dial comprising the graduations 5 as indicating the decimal parts of a unit, one full revolution of the pointer 6 corresponding to the movement of the pointer 11 between two adjacent graduations.

Figure 2:
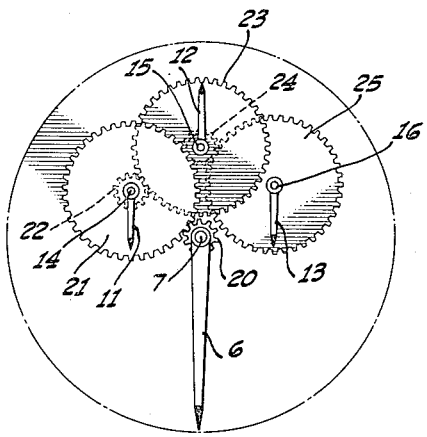
Fig. 2 is an end view showing the instrument of Fig. 1 with the dial plate removed to illustrate the gearing employed for driving the registering mechanism.
Figure 3:
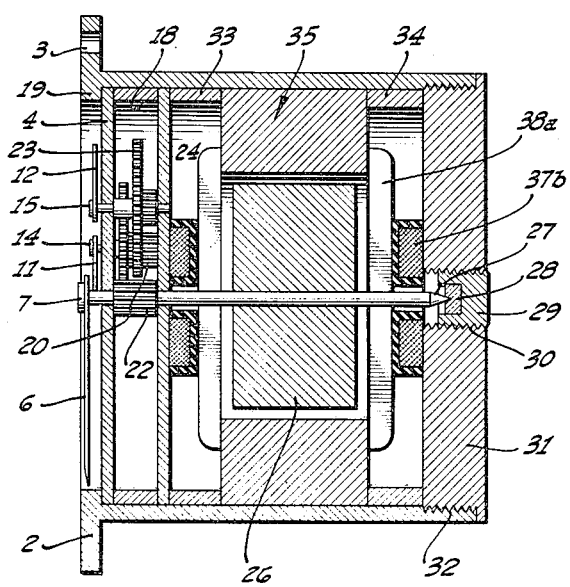
Fig. 3 is a longitudinal sectional view of the instrument shown in Fig. 1.

The gearing which is employed is illustrated in Figs. 2 and 3. As is shown in Fig. 3, the goniometer shaft 7 is journaled in the dial plate 4 and also in a supporting plate 17. The dial plate 4 and supporting plate 17 are mounted within the tubular housing 1 and held in the proper spaced relation by a spacing sleeve 18 which is interposed between the two plates. The assembly is retained within the housing 1 by means of an overhanging portion 19 of the flange 2.

The gearing above mentioned is interposed between the dial plate 4 and the supporting plate 17 and comprises a pinion 20 secured to the goniometer shaft 7 and meshing with a driven gear 21 secured to the pointer shaft 14. Upon the pointer shaft 14 there is mounted a pinion 22 which meshes with a driven gear 23 mounted upon the shaft 15. Similarly a pinion 24 mounted upon the shaft 15 meshes with a driven gear 25 mounted upon the shaft 16 which drives the pointer 13. The drive ratio between each of the pinions and their respective driven gears is made precisely ten to one.

Figure 4:
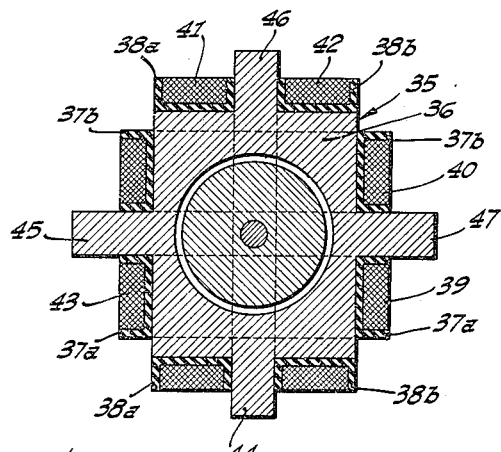
Fig. 4 is a cross sectional view of the coil structure used in the instrument and illustrating particularly the symmetrical arrangement of identical coils which characterizes my invention.
Figure 5:
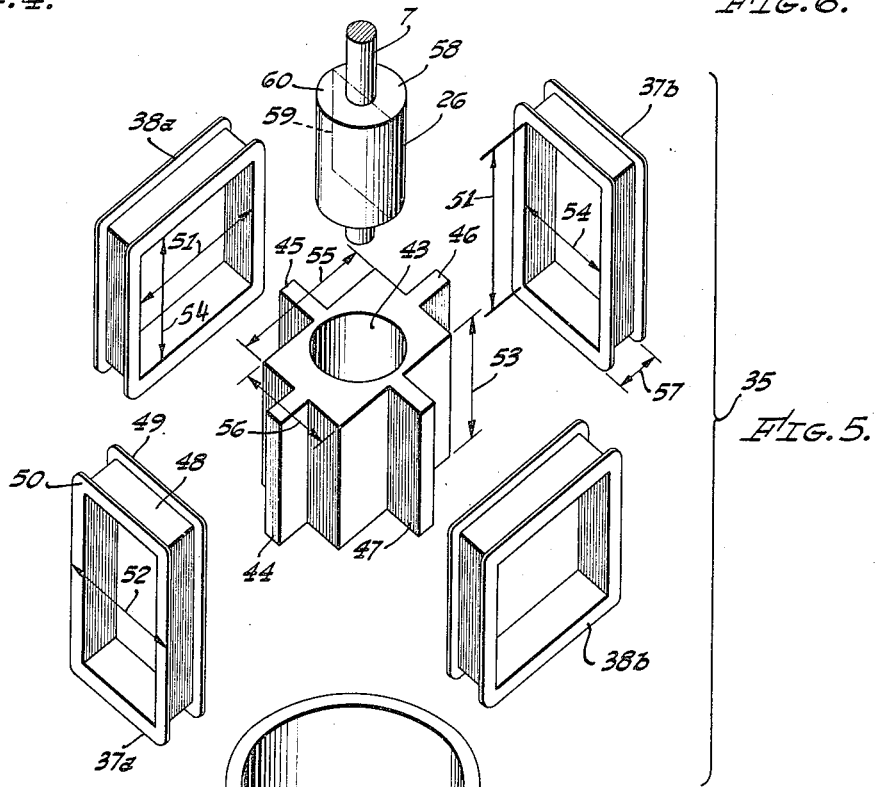
Fig. 5 is an exploded perspective view showing the manner of assembly of the coils and rotor of the goniometer portion of the instrument.

The goniometer shaft 7 is extended through the supporting plate 17 and carries a driving element 26 illustrated in Figs. 3, 4 and 5 as comprising a permanent magnet. The inboard end of the shaft 7 is preferably supported by a jeweled pivot consisting of a conical end 27 formed on the shaft 7 and received within a suitable depression formed in a jewel 28 which may comprise a sapphire or other suitable instrument jewel.

The jewel 28 is suitably mounted within a carrier plug 29 which may be secured as by means of threads 30 to an end cap 31 which is in turn fastened to the housing 1 as by means of threads 32 and which serves also as an end closure for the housing. The end cap 31 serves also to lock the assembly rigidly within the housing 1, and to this end spacer sleeves 33 and 34 are placed within the housing 1 adjacent the supporting plate 17 and the end cap 31, respectively.

These sleeves bear against the plate 17 and end cap 31 and also against opposite faces of a goniometer field structure identified generally in Fig. 3 by the reference character 35. The field structure which is described hereinafter is arranged to impart to the rotor 26 an angular rotation which is exactly equal to the change in phase angle between two alternating potential systems connected to the field coils of the instrument. The extent of this rotation is indicated by the pointer 6 on the dial 5 and if it amounts to more than one full revolution, the accumulative total of the angular changes is registered and indicated by the dials 8, 9 and 10.

The field structure 35 is preferably constructed as shown in Figs. 4 and 5 and comprises a main frame 36, two pair of coil supports 37a, 37b and 38a, 38b, and field coils 39, 40, 41 and 42 wound upon the supports 37a—38b. The main frame 36 is formed as a rectangular block through which is axially extended a cylindrical bore 43 for receiving the rotor 26.

From the midportion of the four side faces of the rectangular block there extend four radially disposed ribs 44, 45, 46 and 47. The ribs 45 and 47 are located diametrically opposite to each other as are the ribs 44 and 46. The length of the ribs is adjusted so that the overall width from the outside edge of the rib 45 to the outside edge of the rib 47 and the corresponding measurement across ribs 44 and 46 are made substantially equal to the inside diameter of the cylindrical housing 1 so that the main frame 36 may be inserted within the housing in the manner illustrated in Fig. 3 and held by the ribs 44—47 centrally within the housing.

Each of the coil supports 37a—38b is made identical and is given a channel or U-shaped cross section defined by a laterally or horizontally extending web portion 48 flanked on either side by outwardly extending flanges 49 and 50. This U-shape defines a channel within which the coil windings 39—42 may be wound.

The dimensions of the main frame 36 and the coil supports 37a—38b bear a unique relation to each other which permits their assembly in a manner to be described hereinafter which in turn provides for a uniform and highly efficient magnetic field. To this end the long inside dimension (see dimension line 51 on coil support 38a of Fig. 5) is made equal to the short outside dimension of the coil support (see dimension line 52 of support 37a, Fig. 5). Similarly, the axial length of the main frame 36 (dimension line 53) is made equal to the short inside dimension of the coil support (see dimension line 54, support 37b, Fig. 5). Also, the long radial width of the main frame 36 represented by the dimension line 55 of Fig. 5 is made substantially equal to the long inside dimension of the coil supports 37a—38b. Similarly the short radial width of the main frame 36 represented by the dimension line 56 is made equal to the smaller inside dimension 54 of the coil supports 37a—38b. Finally, the outside width of each of the coil supports 37a—38b (see dimension line 57, coil support 37b, Fig. 5) is made equal to one-half the difference between the narrower main frame width 56 and the width of the ribs 44 and 46 so that the space along the end faces of the main frame 36 on opposite sides of the ribs 44 and 46 are exactly equal to the width 57 of the supports 37a—38b.

With the dimensions selected as above described the device may be assembled as follows: First, the coils 39—42 are wound in the coil supports 37a—38b. The rotor 26 is then placed within the bore 43. The coil supports 38a and 38b are then moved toward each other as viewed in Fig. 5 to encircle the main frame 36 on opposite sides of the ribs 44 and 46, as is shown in Fig. 4. The coils 37a and 37b are then turned with their long dimension vertically as distinguished from the horizontal disposition of the length of the supports 38a and 38b and are then moved toward each other as viewed in Fig. 5 to encircle the main frame 36 on opposite sides of the ribs 45 and 47 and to encircle also the previously installed supports 38a and 38b.

The final positions of the supports 37a and 37b are shown in Fig. 4. Note that when the coil supports are installed as described, the open ends of the cylinder 43 are closed except for square holes at each end having side dimensions equal to the width of the ribs 45 and 47. Through these square holes the goniometer shaft 7 extends. The width of the ribs 45 and 47 is adjusted to space the centres of the coils of each pair apart a distance substantially equal to the means effective radius of the coil. This dimension is not critical and considerable variation from the desired spacing may be tolerated.

Note also that the field coils are identical, that they are mounted at exactly right angles to each other, and that they are spaced equally from the axis of rotation of the goniometer rotor 26. Furthermore, the coil supports 37a and 37b overlying the supports 38a and 38b serve to lock the latter securely in place so that it is impossible for them to move from their initially installed positions. The outer coil supports 37a and 37b are secured in their proper locations by any suitable means as, for example, by means of an adhesive or cement interposed between the flanges 49 and 50 and the ribs 45 and 47.

The field structure just described is preferably made of a non-magnetic material so as to prevent any distortion of the field produced by the interaction of the four field coils. I have found that the structure just described can be readily manufactured from a thermo-setting synthetic resin such as the phenol-formaldehyde insulating materials by a die casting or molding process. With this process the dimensions may be held closely to the required tolerances and the device may be manufactured in large quantities at low cost. Because of the excellent dielectric properties of these materials, the electrical insulation of the windings one from the other is made very simple. For low frequency work where damping of the rotating element is desirable, the entire main frame 36 may be made of copper or aluminum.

The permanent magnet rotor 26 previously referred to is preferably formed of a permanent magnet material having high retentivity, a preference being expressed for the aluminum-nickel-colbalt alloys such as the one marketed under the tradename "Alnico."

The cylindrical magnet is transversely magnetized; that is, the portion 58 lying on one side of a longitudinal diametrical plane represented by the dotted line 59 in Fig. 5 is given a magnetic polarity opposite to that given to the remaining half 60.

Figure 6:
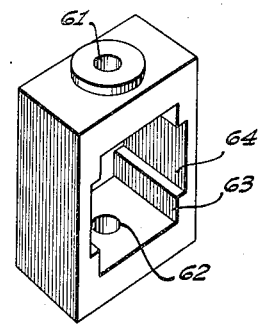
Fig. 6 is a perspective view illustrating a modified form of rotor which may be used in place of the rotor shown in Figs. 1 through 5.

In certain types of instruments of the general class to which this invention relates, it is desirable to use a rotating coil as the goniometer rotor in place of the permanent magnet rotor 26. In Fig. 6 I have illustrated a coil supporting structure which may be used for such purpose. The structure shown in Fig. 6 is preferably molded from "Bakelite" or other suitable thermo-setting phenolic resin and is given the general form of a rectangular solid.

The end faces of the block are bored as indicated at 61 and 62 to receive the goniometer shaft 7 and the diagonal transverse dimension of the block is made somewhat less than the diameter of the cylindrical bore 43 so that the block may freely rotate within the bore. Laterally through the block there is cut a rectangular window 63. The side faces of this window may be recessed as indicated at 64. The coil which is to be mounted within the coil support is, by preference, prefabricated, slipped into the recess 64 and secured therein by any suitable means.

From the foregoing it will be observed that I have provided an indicating and registering goniometer which is characterized by the employment of a registering dial for totalizing and indicating the number of full revolutions made by the goniometer shafts. Furthermore, the instrument of my invention employs a unique coil structure comprising the main frame 36 and the two pairs of coil supports 37a, 37b and 38a, 38b.

Attention is directed to the fact that with the coil arrangement described, the coil supports are made identical and are so mounted upon the main frame 36 as to bring them as close to the axis of the instrument as the diameter of the goniometer shaft 7 will permit.

Also it will be noted that the assembled structure is completely symmetrical so that there is produced a completely uniform and undistorted magnetic field.

While I have shown and described the preferred embodiment of my invention, I do not desire to be limited to any of the details of construction shown or described herein.

I claim:

1. In an electrical goniometer, a field structure comprising: a main frame defining an axis of rotation; and two pair of field coils on said frame, all of said coils being identical, the coils of each pair being mounted coaxially and the coils of one pair being disposed at right angles to the coils of the other pair, said coils being all spaced from said axis of rotation equal distances substantially less than one-half the mean diameter of said coils.

2. In an electrical goniometer including a rotating element mounted on a small diameter rotating shaft, a field structure comprising: a main frame defining an axis of rotation coincident with said shaft; and two pair of field coils on said frame, all of said coils being identical, the coils of each pair being mounted on opposite sides of said axis of rotation and in parallel planes disposed parallel to said axis, the coils of each pair being spaced apart a distance substantially equal to the mean effective radius of said coils, and the coils of one pair being mounted at right angles to the coils of the other pair.

3. In an electrical goniometer including a rotating element mounted on a small diameter rotating shaft, a field structure comprising: a main frame defining an axis of rotation coincident with said shaft; and two pair of field coils on said frame, all of said coils being identical, the coils of each pair being mounted on opposite sides of said axis of rotation and in parallel planes disposed parallel to said axis, the coils of each pair being spaced apart a distance substantially equal to the mean effective radius of said coils, and the coils of one pair being mounted at right angles to the coils of the other pair, the coils of one of said pairs being wound about and encircling the coils of the other pair.

4. In an electrical goniometer including a rotating element mounted on a small diameter rotating shaft, a field structure comprising: a main frame defining an axis of rotation coincident with said shaft; two pair of coil supports on said frame, said supports being identical and formed of insulating material having a channel-shaped cross section defining a wire receiving space, said supports being rectangular in shape with the inside length substantially equal to the outside width, the supports of each pair being mounted on opposite sides of said axis of rotation and in parallel planes disposed parallel to said axis, the centers of the supports of each pair being spaced apart a distance substantially equal to the mean effective radius of said supports, and the supports of one pair being mounted at right angles to the supports of the other pair; and a solenoid coil wound upon each of said supports.

5. In an electrical goniometer including a rotating element mounted on a small diameter rotating shaft, a field structure comprising: A main frame having substantially the form of a rectangular parallelepiped and defining an axis of rotation coincident with said shaft; two pair of coil supports on said frame, said supports being identical and formed of insulating material having a channel-shaped cross section defining a wire receiving space, said supports being rectangular in shape with the inside length substantially equal to the outside width, said main frame having a height measured parallel to said axis and depth each substantially equal to the inside width of said supports and having a breadth substantially equal to the inside length of said supports, the supports of each pair being mounted on opposite sides of said axis of rotation and in parallel planes disposed parallel to said axis, the centers of the supports of each pair being spaced apart a distance substantially equal to the mean effective radius of said supports, and the supports of one pair being mounted at right angles to the supports of the other pair; and a solenoid coil wound upon each of said supports.

WILLIAM J. O'BRIEN.

REFERENCES CITED

The following references are of record in the file of this patent:

UNITED STATES PATENTS

| Number | Name | Date |
|---|---|---|
| 630,419 | Steinmetz | Aug. 8, 1899 |
| 877,311 | Evershed | Jan. 21, 1908 |
| 1,113,565 | Lee | Oct. 13, 1914 |
| 1,206,381 | Hodde et al. | Mar. 26, 1918 |
| 1,922,216 | Persons | Aug. 15, 1933 |
| 2,239,790 | Kollsman et al. | Apr. 29, 1941 |
| 2,277,906 | Eaton | Mar. 31, 1942 |
| 2,356,186 | Somers | Aug. 22, 1944 |
| 2,382,315 | Hiller | Aug. 14, 1945 |
| 2,408,773 | Goodall | Oct. 8, 1946 |
| 2,419,612 | Warshaw | Apr. 29, 1947 |
| 2,458,436 | Smith | Jan. 4, 1949 |

FOREIGN PATENTS

| Number | Country | Date |
|---|---|---|
| 546,000 | Germany | Mar. 8, 1932 |